United States Patent [19]

Haren et al.

[11] Patent Number: 4,691,432
[45] Date of Patent: Sep. 8, 1987

[54] A METHOD OF MAKING A REINFORCED HARD POROUS INK ROLL ASSEMBLY

[75] Inventors: Doyle V. Haren, Clyde, N.C.; Lawrence V. Wiley, Putnam County, Tenn.

[73] Assignee: Day International Corporation, Dayton, Ohio

[21] Appl. No.: 785,705

[22] Filed: Oct. 9, 1985

[51] Int. Cl.⁴ .................... B22D 11/01; B32B 31/22; B41J 27/12
[52] U.S. Cl. .................................. 29/527.2; 101/348; 101/401.1; 264/112; 264/118; 264/139; 264/267; 400/470; 430/310
[58] Field of Search .............. 246/139, 267, 308, 162, 246/163, 311, 112, 118; 101/205, 348, 367, 401.1, 207, 208, 32; 400/470, 662; 430/306, 307, 310; 29/527.2

[56] References Cited

U.S. PATENT DOCUMENTS

| | | |
|---|---|---|
| 178,229 | 6/1876 | Bruen . |
| 1,951,430 | 3/1934 | McLaughlin . |
| 2,763,208 | 9/1956 | Rockoff et al. ........................ 264/54 |
| 3,100,676 | 8/1963 | Christie ................................. 264/275 |
| 3,283,714 | 11/1966 | Carpenter et al. ............... 101/401.1 |
| 3,336,244 | 8/1967 | Rockoff .............................. 264/122 |
| 3,475,803 | 11/1969 | Hill ..................................... 264/D14 |
| 3,712,215 | 1/1973 | Cunningham . |
| 3,734,014 | 5/1973 | Oda . |
| 3,812,782 | 5/1974 | Funahashi ........................... 101/367 |
| 4,024,816 | 5/1977 | Williams et al. .................... 101/426 |
| 4,089,922 | 5/1978 | Saito et al. .......................... 264/108 |
| 4,106,408 | 8/1978 | Holland ............................. 101/401.1 |
| 4,556,333 | 12/1985 | Stefansson .............................. 400/58 |
| 4,605,328 | 8/1986 | Shomura et al. . |

Primary Examiner—Jan H. Silbaugh
Assistant Examiner—Karen D. Kutach
Attorney, Agent, or Firm—Killworth, Gottman, Hagan & Schaeff

[57] ABSTRACT

A reinforced hard porous ink roll assembly and a method of making same. The ink roll assembly of the invention comprises a hard porous material suitable for inking, the improvement comprising a hard ink resistant material encompassing a substantial portion of the outside surface of the roll to provide reinforcement therefor. A method of making the roll of the invention is also provided in which the hard porous inking material is made by metering the polymeric material which is used to form said hard porous material into a mold in increments, and applying pressure to the mold and polymeric material at each increment. After the mold is filled with the polymeric material, the polymeric material is cured. The roll is cooled and a strip of the mold material is milled to expose a small portion of the hard porous inking material in a straight strip parallel to the longitudinal axis of the roll.

15 Claims, 7 Drawing Figures

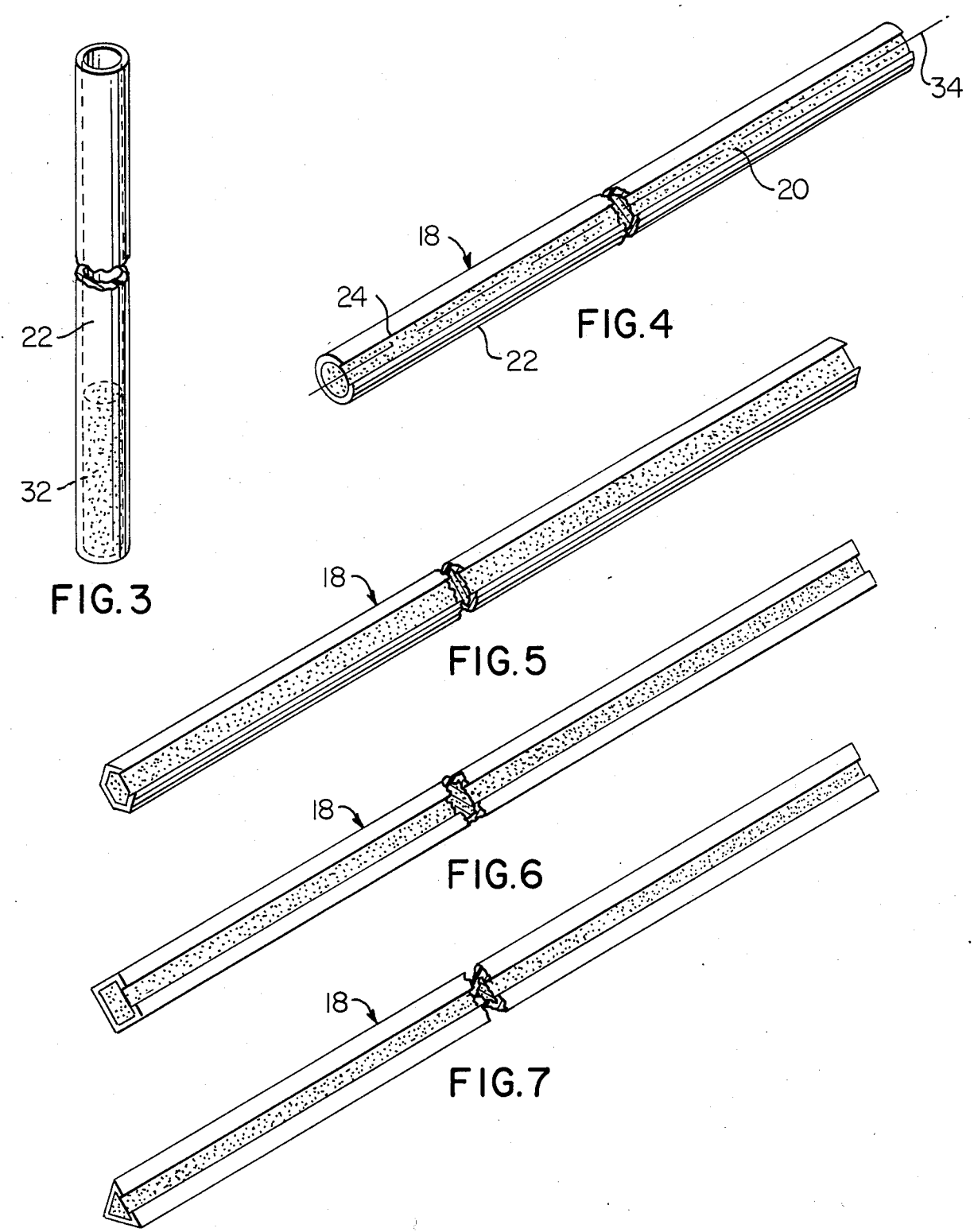

A METHOD OF MAKING A REINFORCED HARD POROUS INK ROLL ASSEMBLY

BACKGROUND OF THE INVENTION

1. Field of the Invention

The present invention relates to a printing assembly, an inking roll used in said printing assembly, and the method of making said inking roll.

2. Information Disclosure Statement

In some prior art printing machines, a multi-color print mechanism is used in which the print mechanism comprises a cylinder approximately one inch in diameter and approximately six inches long, in which are embedded a number of inking rolls. The inking rolls of the printing assembly are approximately one quarter inch in diameter and are uniformly spaced in the cylinder. If desired, each of the inking rolls may be inked with a different color ink. Because the inking rolls are substantially permanently attached to the printing assembly, when any of the inking rolls is worn, or the ink on any of the rolls is depleted, the entire assembly is discarded.

Since the inking rolls used with the printing assembly are about ¼ inch in diameter, it is difficult to machine such rolls individually without breaking. Also, a roll having such a small diameter cannot be molded due to warping and breaking during demolding.

Accordingly, there is a need in the art for making a printing assembly in which the inking rolls are interchangeable, such that all the rolls, or one individual roll, may be exchanged without having to discard the entire printing assembly.

There is also a need in the art for an inking roll which is designed to transfer ink only to the intended document, and has an ink free surface which can be handled by the operator.

Also, there is a need in the art for an inking roll having reinforcement for added strength.

It is known in the art to make a printing roll by filling a glass cylinder with polymeric material, curing, and then breaking the glass mold to expose the printing surface as is described by Christie in U.S. Pat. No. 3,100,676.

It is known in the art to provide an inking roll in which a portion does not ink, as is described by Williams in U.S. Pat. No. 4,024,816.

SUMMARY OF THE INVENTION

The present invention relates to a printing assembly comprising a print mechanism consisting of a rigid cylinder having a plurality of inking rolls attached thereto. The printing assembly is characterized in that the inking rolls are adapted to be replaced individually.

The present invention also relates to an inking roll comprising a hard porous material suitable for inking. The hard porous inking material of the roll is encompassed with an ink-resistant material over a substantial portion of the outside surface of said roll to provide reinforcement therefor.

A method is provided for making an inking roll comprising the steps of molding a hard porous material in the shape of a roll by metering the polymeric material used to form said hard porous material into a mold. Pressure is applied to the polymeric material in the mold in the filling process. After the mold is filled, the polymeric material is cured or sintered in the mold. After cooling the roll, a straight strip of the mold material is milled to expose a small portion of the hard porous inking material of the inking roll in a straight strip parallel to the longitudinal axis of the roll.

BRIEF DESCRIPTION OF THE DRAWINGS

The accompanying drawings illustrate a present preferred embodiment of the invention, in which:

FIG. 3 illustrates a mold partially filled with polymeric material illustrating a method of the invention;

FIG. 4 illustrates a completed inking roll made according to the invention; and

FIGS. 5-7 illustrate inking rolls having alternative shapes.

DESCRIPTION OF THE PREFERRED EMBODIMENTS

Figure 1:
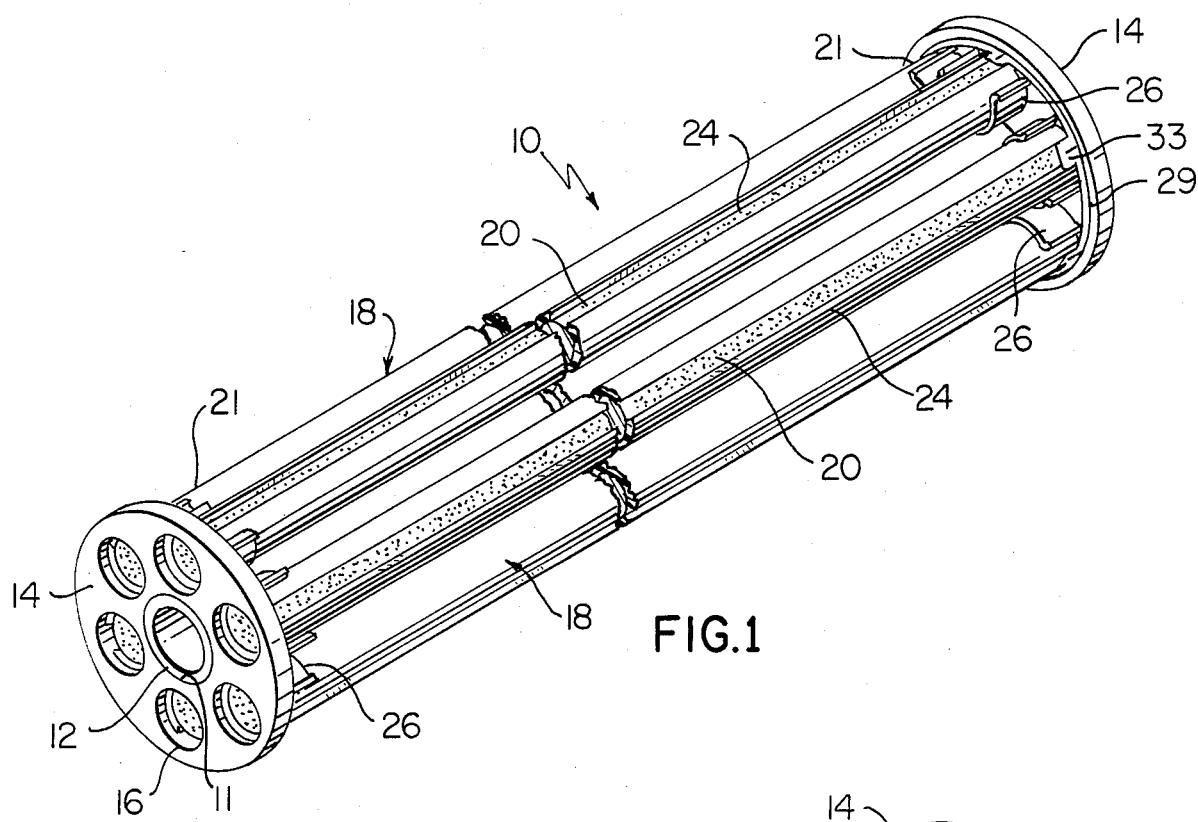
FIG. 1 illustrates a perspective view of the printing assembly of the invention.

Reference is now made to FIG. 1 which illustrates a printing assembly of the invention which is generally represented by reference number 10. The printing assembly 10 comprises a rigid cylinder 12, plates 14 having central hole 11 for attachment to cylinder 12 and peripheral holes 16, and inking rolls 18. Rigid cylinder 12 is the core of the printing assembly 10, and the round rigid plates 14, having an inside diameter greater than the diameter of cylinder 12, are attached at each end thereof by welding or cementing. The holes 16 are provided in the peripheral edges of plates 14 to provide, in part, for attachment of inking rolls 18 to the rigid plates 14. The holes 16 in plates 14 are aligned from end to end on the cylinder 12 such that when the ends 21 of inking rolls 18 are inserted into holes 16, inking rolls 18 are aligned substantially parallel to the longitudinal axis of cylinder 12 and printing assembly 10.

In its operation, each inking roll 18 of the printing assembly 10 may be inked with a different color ink. The operator, to print in a particular color, needs only to rotate the printing cylinder 10 so that the inking roll 18, having the desired color of ink, is properly oriented, and locked into position with respect to the document being printed.

In the illustrated embodiment of the present invention, the printing assembly 10, including inking rolls 18, is approximately 6 inches long and is about 1 inch in diameter. Inking rolls 18 are also about 6 inches long, and may be of any diameter which may be required for a specific purpose. A representative inking roll may have a diameter of about ¼ inch.

In the illustrated embodiment, individual inking rolls 18 are adapted to be replaced individually as needed when they become worn or the ink supply is expended. This contrasts with prior art printing assemblies in which the entire assembly must be discarded when one of the inking rolls is expended.

Figure 2:
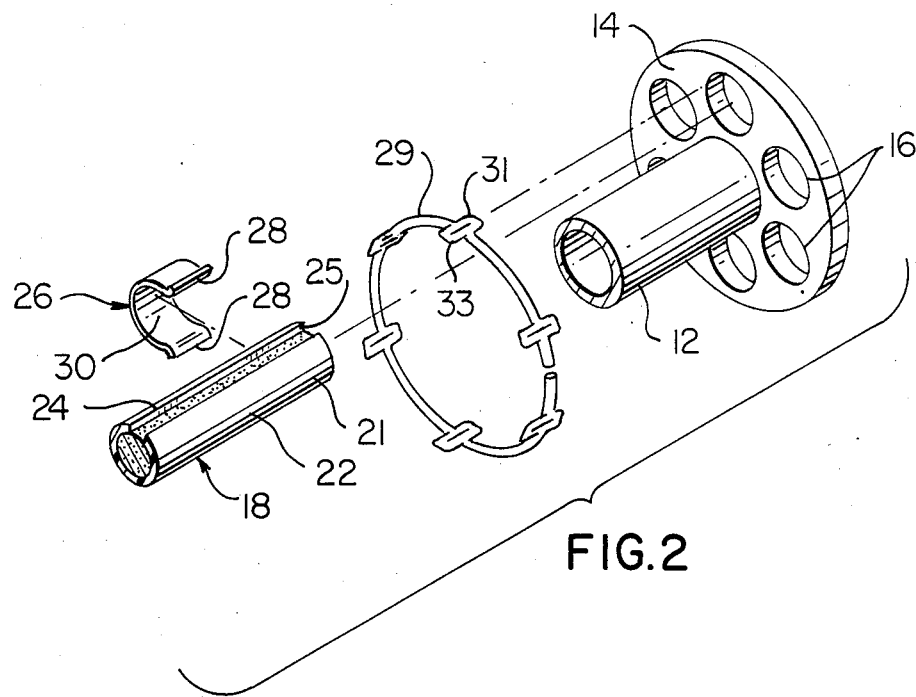
FIG. 2 illustrates an exploded view of a mechanism of the invention by which an inking roll is attached to the printing assembly.

Reference is now made to FIG. 2 which illustrates a mechanism by which individual inking rolls 18 may be removably attached to the printing assembly 10 of the invention. A generally semi-circular clip, generally designated by reference number 26, is attached by, for example, welding or cementing, to plate 14 in close proximity to holes 16. Inking roll 18 is cut to a length such that when inking roll 18 is inserted between the plates 14 of the printing assembly 10, the ends 21 partially enter holes 16. Clip 26 comprises a generally semicircular holding area 30 for receiving an inking roll 18 therein, and ends 28 which are adapted to hold an inking roll 18 in place. A locking mechanism 29, which may comprise a wire spring, may be attached to clip 26 such that the locking mechanism 29 has protrusion 31 adapted to contact hole 16 and protrusion 33 adapted to contact inking roll 18 at notch 25, said locking mechanism being provided to prevent rotation of the inking roll 18 on the printing assembly 10. Other means of attaching and locking an inking roll 18 in a printing assembly will be readily apparent to those skilled in the art, and all such means are intended to be included in the present invention.

Clip 26 is preferably made of a resilient material, and has an arc length, as measured between ends 28, of more than a half circle, such that when an inking roll 18 is pressed into clip 26, ends 28 are pushed apart, so that there is a wider gap between ends 28, to permit entry of inking roll 18 into holding area 30. After entry of inking roll 18 into holding area 30, the ends 28 return to their normal position, holding inking roll 18 in place.

The inking rolls are disposed in the printing assembly such that a strip 24 of hard porous polymeric material 20 is exposed, when cylinder 12 is rotated to the proper position, to the document being printed. Ink resistant cover member 22 provides reinforcement for the inking roll 18, and makes it possible to insert and remove inking roll 18 from printing assembly 10 without mess, since the operator can handle inking roll 18 by the ink resistant cover member 22 when inking roll 18 is changed. Preferably, ink resistant cover member 22 is made from an ink resistant material.

A hard porous polymeric material 20, having interconnected passages and voids, is used as an inking medium in the inking roll 18. The particular polymeric material 20 used is preferably inert to the inking compositions used. When inking roll 18 is inked, the ink seeps into the interconnected passages and forms reservoirs of ink in said passages and in said voids. Any polymer known to be useful for this purpose can be used. Preferably the polymer which may be used to form said hard porous inking roll will be a sintered blend of thermoplastic and thermosetting materials such as a blend of vinyl and polyethylene, phenolic and stabilizers.

The hard porous polymer 20 used in the inking roll 18 may be made by any means known in the art for making such a material. In the preferred method of making printing roll 18, the raw polymer 32 is provided in a particulate form, said particles preferably being of a size in the range which retains about 3% of said particles on a 50 mesh screen. In the preferred embodiment of the method, as is illustrated in FIG. 3, polymer 32 is metered into cover member 22 in increments, and pressure is applied to polymer 32 and cover member 22 at each increment to reduce the possibility of air pockets being formed in polymer 32. After cover member 22 is filled, the ends are capped, and the polymer 32 and cover member 22 are subjected to a curing or sintering step at a temperature, pressure and for a time suitable for the particular polymer 32, and the cover member 22 material used, to cause the particles to adhere to one another in a solid mass, without changing their individual particle shapes. The material used in cover member 22 is rigid to provide reinforcement for inking roll 18, and is inert to the inking compositions used. From the foregoing description, it will be appreciated that cover member 22 serves a variety of purposes. In the finished printing assembly 10, the cover member 22 provides a covering for the hard porous polymer 20 inking material contained therein, thereby adding rigidity to the inking roll 18 and enabling the user to remove the inking roll 18 from the printing assembly 10 without mess. During the manufacture of the inking roll 18, the cover member 22 serves as a mold for the raw polymer 32, which is later cured into the hard porous polymer 20 inking material.

In the illustrated embodiment of the invention, the material used in cylinder 12, plates 14 and cover member 22 may be selected from the group comprising aluminum, steel, hard vinyl, hard phenolics, hard plastics, hard rubber, polymer blends and composites thereof. Aluminum is preferred.

By providing polymer 32 in particulate form, the presence of interconnected passages and voids in the polymer is assured because, when the polymer is cured or sintered below its melting point, there will be gaps left between individual particles, as is described in U.S. Pat. No. 4,024,816 to Williams et al., and by Rockoff in U.S. Pat. No. 3,336,244.

It will be recognized by those skilled in the art that a hard porous polymeric material also can be made by the well known salt leaching process as is described in U.S. Pat. No. 4,025,685 to Haren et al.

After the polymeric material and cover member 22 are cured, and cooled, the assembly thus formed is milled to remove a straight strip 24, such as 15% of the cover member 22 on a line parallel to the longitudinal axis 34 of the inking roll 18 as is illustrated in FIG. 4. The milling operation exposes hard porous polymeric material 20 in said straight strip 24. Straight strip 24 is used as the inking medium when inking roll 18 is used in a printing operation. The assembly is then cut to the required length.

In an illustrative embodiment of the method of the invention, approximately ¼ of the polymeric material used to form the hard porous compound was metered into a phenolic cover member. Pressure was applied to the cover member, and the polymeric material. This cycle was repeated four times until the cover member was filled, and end caps were placed on the cover member. The assembly was placed in a 305° F. oven, and cured for 1.5 hours. The molded assembly was removed from the oven and cooled. The cooled assembly was placed on a milling machine, and a ⅛ inch wide strip of phenolic material was removed from the outer surface. The ⅛ strip of material was removed in a straight line, parallel to the longitudinal axis of the roll, leaving the hard porous polymeric inking material exposed. The strip of exposed hard porous inking material is the inking medium for the print mechanism described above. The assembly was cut to the length needed for an inking roll, and the hard porous material was inked. As is apparent, the cover member becomes part of the inking roll.

Thus the inking roll of the assembly comprises the hard porous polymeric material (inking material) which is encompassed by a cover member 22 composed of a hard, ink resistant material. The inking medium of the inking roll comprises a single strip of exposed hard porous inking material 20, which has been exposed by milling a small strip of the hard, ink resistant cover member 22.

The inking roll assembly of the invention can be inserted into an existing multicolored print mechanism. Each inking roll may be changed as that particular roll is expended. The master cylinder of the multicolor print mechanism may be reused since each individual inking roll is discarded as it is expended. The hard ink resistant cover member 22 which encompasses the inking material 20 makes it possible for the inking roll 18 to be handled without getting ink on the operator.

Although it is preferred that a round inking roll be used, the inking roll may be made in the shape of a hexagon, a square, a triangle, or any other suitable geometric shape. Inking rolls having alternative geometric shapes are illustrated in FIGS. 5–7.

While present embodiments of this invention and methods of practicing the same have been illustrated and described, it will be recognized that this invention may be otherwise variously embodied and practiced within the scope of the following claims.

What is claimed is:

1. A method of making an inking roll including a hard porous inking material encompassed by a hard ink resistant material over a substantial portion of an outside surface of said inking roll comprising
   providing a cover member of said ink resistant material having a generally hollow interior,
   filling said hollow interior with a polymeric material capable of yielding said hard porous material upon curing,
   curing said polymeric material in said cover member to cure said polymeric material into said hard porous material and,
   removing only a portion of said cover member to exteriorly expose only a portion of said hard porous material.

2. The method of claim 1 wherein the step of filling said hollow interior with a polymeric material comprises the step of metering said polymeric material into said interior in increments.

3. The method of claim 2 wherein said step of metering said polymeric material includes the step of applying pressure to said cover member and polymeric material at each said increment.

4. The method of claim 1 wherein the step of providing a cover member comprises the step of providing a cover member having an outside diameter of about ¼ inch.

5. The method of claim 1 wherein said polymeric material is cured in said cover member at about 305° F. for about 1.5 hours.

6. The method of claim 1 wherein the step of providing said cover member comprises the step of providing a cover member having a thickness of about ⅛ a diameter of said ink roll.

7. The method of claim 1 wherein the step of removing only a portion of said cover member comprises the step of milling about 15% of said cover member to expose a straight strip of said hard porous material parallel to a longitudinal axis of said ink roll.

8. The method of claim 1 wherein the step of removing only a portion of said cover member comprises the step of removing a strip of said cover member to expose a straight strip of said hard porous material parallel to a longitudinal axis of said roll.

9. The method of claim 1 wherein the step of providing a cover member comprises the step of providing a cover member having a generally circular cross sectional shape.

10. The method of claim 1 wherein the step of providing a cover member comprises the step of providing a cover member having a generally hexagonal cross sectional shape.

11. The method of claim 1 wherein the step of providing a cover member comprises the step of providing a cover member having a generally square cross sectional shape.

12. The method of claim 1 wherein the step of providing a cover member comprises the step of providing a cover member having a generally triangular cross sectional shape.

13. The method of claim 1 wherein the step of providing a cover member comprises the step of providing a cover member composed of a material selected from the group consisting of metallic, phenolic, hard plastic, and polymer blend materials.

14. The method of claim 1 wherein the step of filling said hollow interior with a polymeric material comprises the step of filling said interior with a blend of thermoplastic and thermosetting materials, and said step of curing said polymeric material comprises the step of sintering said blend of thermoplastic and thermosetting materials into said hard porous material.

15. A method of making an inking roll including a hard porous inking material encompassed by a hard ink resistant material over a substantial portion of an outside surface of said inking roll comprising
   providing a cover member composed of said ink resistant material, the cover member including a generally continuous side wall defining an interior portion, and at least one open end,
   filling said hollow interior with a blend of thermoplastic and thermosetting materials by metering said blend into said interior in increments,
   curing said blend to form said blend into said hard porous material, and
   removing a strip of said cover member to exteriorly expose a straight strip of said hard porous material generally parallel to a longitudinal axis of said inking roll.

* * * * *